United States Patent [19]

Flom et al.

[11] Patent Number: 5,117,139
[45] Date of Patent: May 26, 1992

[54] SUPERCONDUCTING BEARINGS WITH LEVITATION CONTROL CONFIGURATIONS

[75] Inventors: Yury Flom, Silver Spring; James D. Royston, Columbia, both of Md.

[73] Assignee: The Unites States of America as represented by the United States National Aeronautics and Space Administration, Washington, D.C.

[21] Appl. No.: 691,609

[22] Filed: Apr. 17, 1991

[51] Int. Cl.$^5$ .................... H02K 1/14; F16C 32/04
[52] U.S. Cl. .................................. 310/90.5; 505/876
[58] Field of Search ................. 310/90.5, 90; 505/876

[56] References Cited

U.S. PATENT DOCUMENTS

| | | | |
|---|---|---|---|
| 3,184,271 | 5/1965 | Gilinson, Jr. | 310/90.5 |
| 3,845,997 | 11/1974 | Boden et al. | 310/90.5 |
| 4,726,640 | 2/1988 | Iwama et al. | 310/90.5 |
| 4,886,778 | 12/1989 | Moon et al. | 505/1 |
| 4,939,120 | 7/1990 | Moon et al. | 505/1 |
| 4,956,571 | 9/1990 | Gordon et al. | 310/90.5 |
| 4,983,869 | 1/1991 | Vaidya et al. | 310/90.5 |
| 5,043,615 | 8/1991 | Oshima | 310/90.5 |
| 5,051,637 | 9/1991 | Harris et al. | 310/90.5 |

Primary Examiner—Steven L. Stephan
Assistant Examiner—D. L. Rebsch
Attorney, Agent, or Firm—R. Dennis Marchant; John R. Manning; Paul S. Clohan, Jr.

[57] ABSTRACT

A superconducting bearing for a rotating member having a magnet at each extremity of the rotating member; having a bearing made of a material exhibiting Type II superconducting properties, the bearing is formed as a recess in the superconducting material in the form of a cylindrical, closed-end orifice. The bearing exerts levitation forces on the magnets at each extremity of the rotating member. Several methods for controlling the levitation forces exerted by the bearing on the magnets at each extremity of the rotating member are shown. One method is to construct the bearing from two different types of superconducting materials. Another method is to provide heating elements in the bearing. A further method is to provide an electromagnetic coil above the bearing. The bearing could also be segmented or have material removed to control the levitation forces.

7 Claims, 8 Drawing Sheets

PRIOR ART

FIG. 1

PRIOR ART

FIG. 14

# SUPERCONDUCTING BEARINGS WITH LEVITATION CONTROL CONFIGURATIONS

ORIGIN OF THE INVENTION

The invention described herein was made by employees of the United States Government, and may be manufactured and used by or for the Government for governmental purposes without the payment of any royalties thereon or therefor.

TECHNICAL FIELD

This invention relates to bearing devices in general, to superconducting bearings in particular, and also to devices for centering the rotating shaft within superconducting bearings.

BACKGROUND ART

Conventional bearings for rotating shafts are subject to wear, noise, vibration and thermal breakdown. Until recently, practical magnetic bearings were either a permanent magnetic or an electromagnetic type. Permanent magnet bearings were subject to inherent static instabilities and had to be stabilized in at least one degree of freedom by non-magnetic bearings. Electromagnetic bearings often required elaborate position sensors and electronics to achieve stability.

Prior art devices attempted to improve magnet bearings by using the material property known as superconductivity. In those devices, either the bearing member or the rotating member, or both, are confined in a Type I superconducting state in order to achieve a magnetic pressure between the members and thereby provide a degree of levitation. Type I superconductors exhibit perfect diamagnetism up to a critical applied field, at which point superconductivity is lost and the magnetization of the sample rises abruptly.

Recent advances in the art of superconductivity have resulted in new ceramic compositions which exhibit superconducting properties at higher temperatures. These new superconductors are known as Type II materials with higher critical fields. Type II superconductors enable magnetic flux to penetrate into its interior in clusters of flux lines, establishing circulating superconducting currents within the superconductor. They, in turn, generate substantial magnetic fields and exert a positional pinning effect on a magnet levitated over the surface of the superconductor.

An important advantage of levitated superconducting bearings is its ability to allow rotational speeds of 10's of thousands of rpm. However, stability of prior art devices was a problem in that the effect of gravity or other forces often caused the devices to fail to achieve the desired reliability.

STATEMENT OF THE INVENTION

It is therefore an object of the present invention to improve the stability of radial superconducting bearings.

A further object of the present invention is to provide a means for counteracting the effects of gravity on the rotating member in radial superconducting bearings.

A still further object of the present invention is to provide a means to vary the levitation forces within radial superconducting bearings.

The foregoing objects are achieved by providing a new type of circular bearing structure which consists of not one, but two superconducting materials in which one superconducting material has a different levitation capability than the other superconducting material. This enables a balance of forces on the rotor when the rotor and bearing structure are concentric. A second device for balancing the forces on the rotor varies the temperature profile of the circular bearing structure in such a way as to compensate for the displacement of the rotor due to gravity or other external forces. One method of changing the temperature profile of the circular bearing structure is to embed several heating elements within the top portion of the circular bearing structure. A still further device for balancing the forces within the circular bearing structure has electromagnetic control over the levitating or restoring forces of the circular bearing structure. In this embodiment, an electromagnetic coil is used to reduce the levitating force by generating an electromagnetic field above the circular bearing structure. A still further device for balancing the forces within the circular bearing structure has a circular bearing structure with four circular bearing structure segments to control the levitating or restoring forces of the circular bearing structure. Each circular bearing structure segment is held in place by adjusting rod which is then raised or lowered by an electric motor. The movement of the adjusting rod in and out causes its attached circular bearing structure segment to move towards or away from the rotor which allows adjustment of the forces. Four additional devices for control of the restoring forces are: a circular bearing structure with an external groove machined along the top of the superconducting material comprising circular bearing structure; a circular bearing structure with four apertures machined along the top of the superconducting material comprising circular bearing structure; a circular bearing structure with an internal groove machined along the top of the superconducting material comprising circular bearing structure; and a circular bearing structure with a slot machined along the top of the superconducting material comprising circular bearing structure. In each of these embodiments effective control of the upper restoring force is provided by removing a portion of the superconducting material comprising the circular bearing structure.

DETAILED DESCRIPTION OF THE INVENTION

Figure 1:
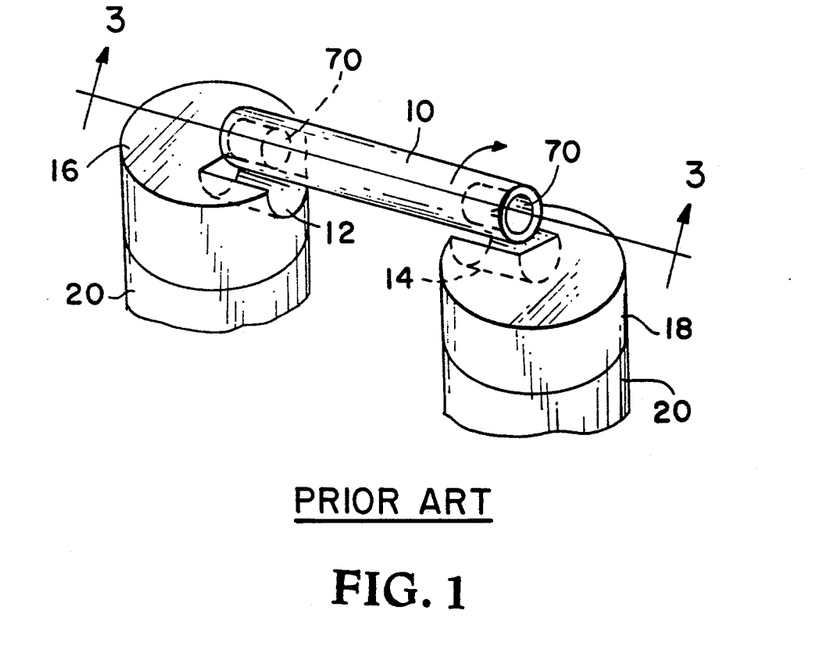
FIG. 1 is an illustration of a prior art partially enclosed (open design) superconducting bearing.
Figure 2:
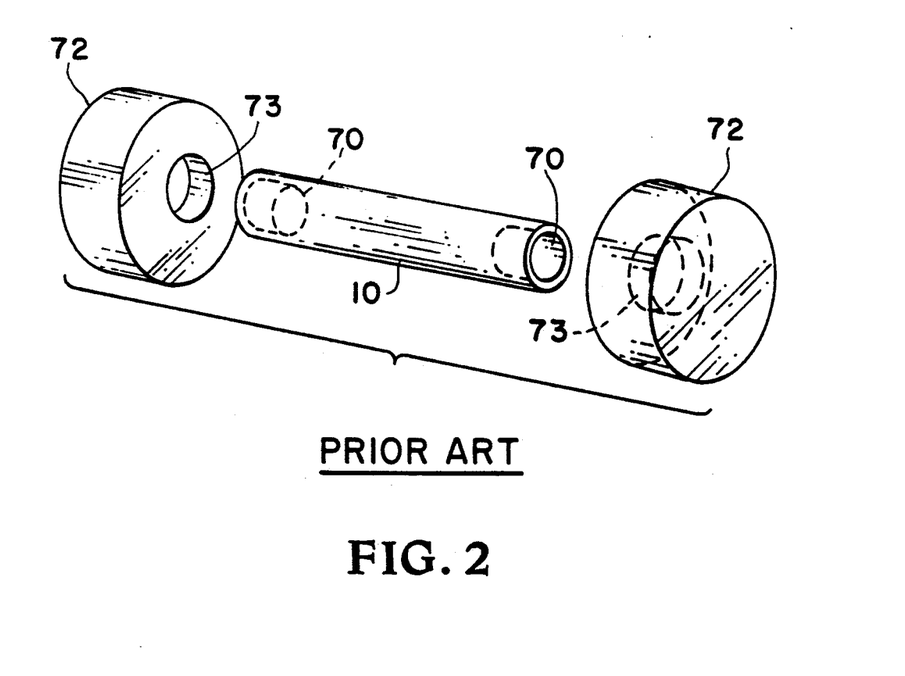
FIG. 2 is an illustration of a prior art completely enclosed (cylindrical design) superconducting bearing.

Two prior art methods of employing superconducting bearings on a rotating assembly are shown in FIGS. 1 and 2. Referring first to FIG. 1, a rotor 10 fits within recesses 12 and 14 in bearing blocks 16 and 18 respectively. Rotor 10 also includes two levitating magnets 70 which are preferably cylindrical in shape and have their north/south polar axes aligned with centerline of rotor 10. Magnets 70 are preferably composed of samarium cobalt and exhibit a linear dipole. Other rare earth magnets are also acceptable (for instance Nd, B, Fe based magnets). Each of bearing blocks 16 and 18 is mounted on a copper or aluminum pedestal 20 which is, in turn, immersed in a supercold liquid such as liquid nitrogen. Each of bearing blocks 16 and 18 is comprised of a material which exhibits Type II superconducting properties when it is maintained at a temperature less than its critical temperature. A preferred material for bearing blocks 16 and 18 is the ceramic compound $YBa_2Cu_3O_x$. Other Thallium, Bismuth or other ceramic based compounds which exhibit Type II superconducting properties are also acceptable. An appropriate material for pedestals 20 is a 6063 alloy of aluminum.

The provision of conductive pedestals 20 to support bearing blocks 16 and 18 enables the level of the superconducting fluid to be kept away from the rotating member. Thus, the rotating member and upper portions of bearing blocks 16 and 18 may be mounted in a vacuum to enable high rotating speeds. Bearing blocks 16 and 18 will obtain Type II superconducting properties when pedestals 20 are immersed in liquid nitrogen, even when such immersion occurs at a substantial distance from the bearing blocks.

Referring now to FIG. 2, a circular bearing structure 72 made from homogeneous Type II superconducting material is illustrated which includes an orifice 73 enclosing each extremity of rotor 10. As with the system shown in FIG. 1, rotor 10 includes magnets 70 at each of its extremities. While not shown in the drawings, in normal use rotor 10 may have mounted thereon any number of different types of components.

Figure 3:
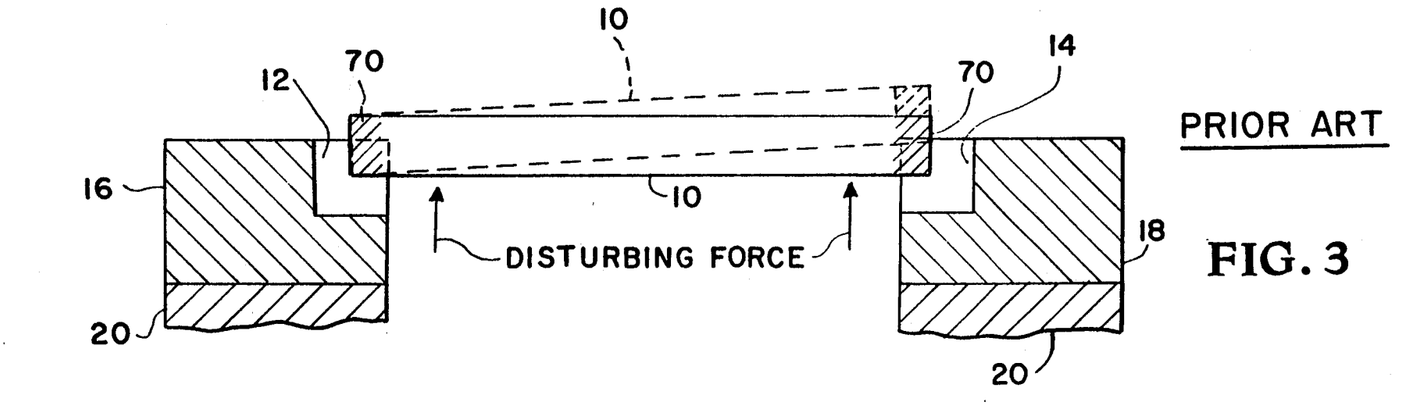
FIG. 3 is an illustration of a disturbing force acting on a prior art partially enclosed (open design) superconducting bearing.

In the prior art device shown in FIG. 1, stable rotation of rotor 10, when supported by bearing blocks 16 and 18, occurs only when there is no disturbing force acting upon rotor 10. If, however, a disturbing force in the radial direction is applied to rotor 10, rotor 10 may dislodge from recess 12 or 14 in bearing block 16 or 18. This potentially catastrophic condition is shown in FIG. 3, which is a cross-section of FIG. 1 along lines 3—3. If the disturbing force, shown by the two lower arrows, is greater than the restoring force acting on rotor 10 due to the flux pinning of magnets 70, then rotor 10 may dislodge, as shown by the dashed outline of rotor 10. This will cause the complete failure of the FIG. rotating system, and is a prime reason why a circular bearing structure has become the preferred design.

Figure 4:
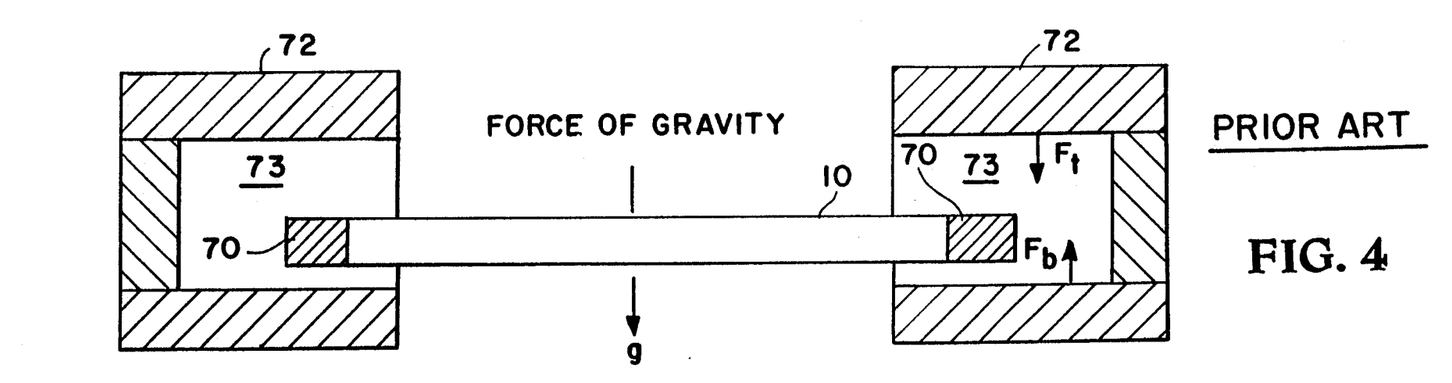
FIG. 4 is an illustration of the force of gravity acting on a prior art enclosed superconducting bearing.

There are, however, problems associated with circular bearing structures as well. When rotor 10 is inserted in a circular bearing structure 72, as shown in FIG. 2, rotor 10 will eventually shift down from its concentric position due to the force of gravity g. This condition is shown in FIG. 4 This condition occurs because the lower restoring force $F_b$, from the bottom portion of circular bearing structure 72, is equal to the upper restoring force $F_t$, from the top portion of circular bearing structure 72, thus the force of gravity g remains unbalanced until the rotor 10 moves off center to a position where force equilibrium is achieved, i.e. $F_b = F_t = g$. This latter configuration, shown in FIG. 4, is an eccentric position for rotor 10 and, therefore, the aerodynamic effects on the rotating rotor 10 are not symmetrical about the rotor 10 longitudinal axis. Consequently, a difference in static pressure on rotating rotor 10 may also result in shifting rotor 10 down, in the direction of gravity.

The present invention corrects these unbalanced forces acting on the rotor when it is confined in a circular bearing structure. One device for balancing the forces, shown in FIG. 5, has a new type of circular bearing structure 1 which consists of two different superconducting materials 2 and 4. Wedge A is made from a Type II superconducting material that has a different levitation capability than Type II superconducting material 4. In the preferred embodiment, superconducting material 2 has a lesser levitation capability than superconducting material 4. This enables a balance of forces on rotor 10 when rotor 10 and bearing structure 1 are concentric as shown, i.e., $F_b = F_t + g$. This balance is achieved by changing the width of wedge A until the force of gravity, or other external forces, are balanced. Wedge A width will vary depending upon the weight of rotor 10. In this embodiment, superconducting materials and 4 could be a low temperature type superconductor such as NbSn or NbTi, or a high temperature type superconductor such as Yttrium, Bismuth, or Thallium based ceramics.

Figure 5:
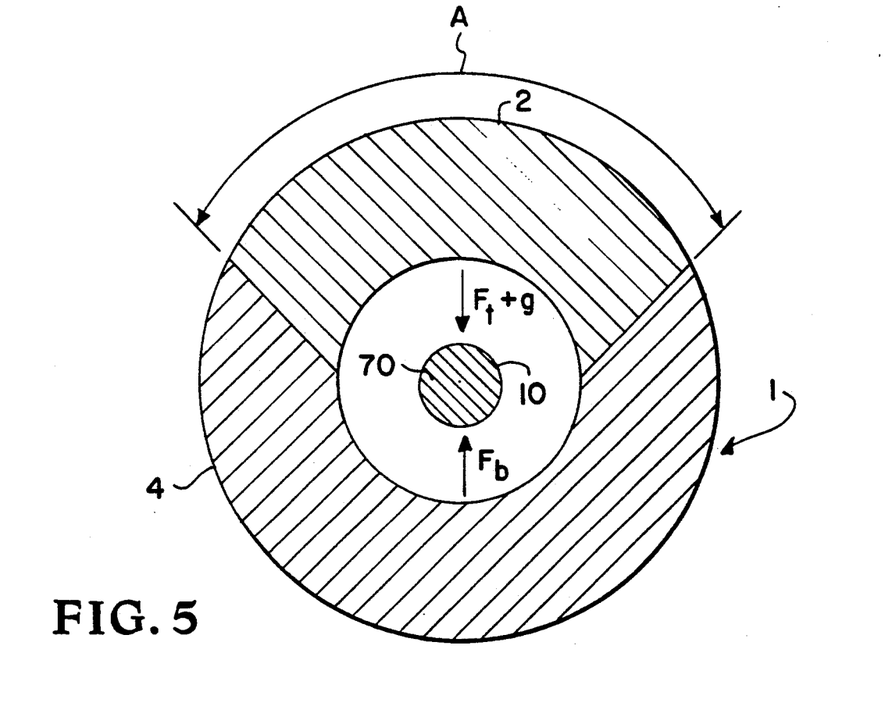
FIG. 5 is a view of a superconducting bearing according to the present inventive concept.
Figure 6:
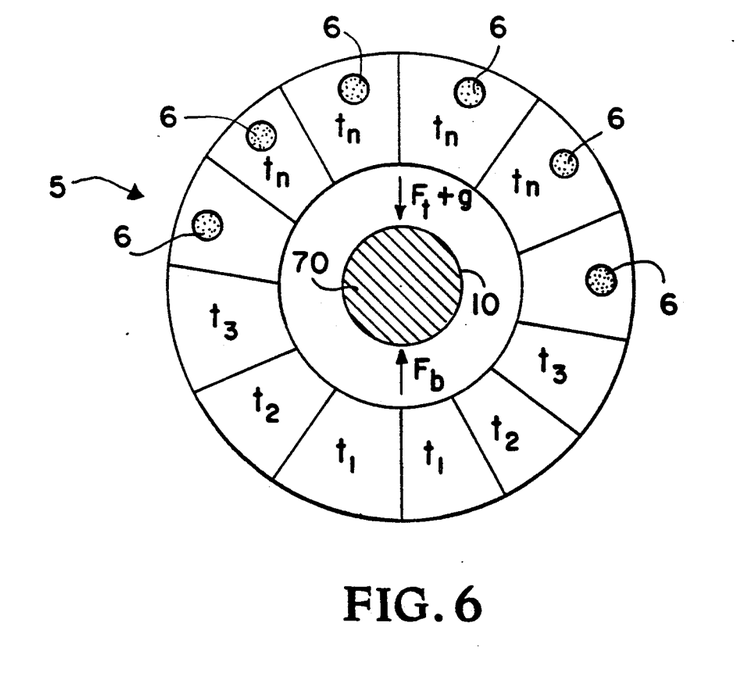
FIG. 6 is a view of temperature profile control of a superconducting bearing according to the present inventive concept.

Another device for balancing the forces on rotor 10 is shown in FIG. 6, which achieves the same result as FIG. 5, without using two different superconducting materials. In this embodiment, the temperature profile of circular bearing structure 5 is controlled in such a way as to compensate for the displacement of rotor 10 due to gravity or other external forces. For example, if the bottom half of the circular bearing structure 5 is colder than the top half of circular bearing structure 5, the lower restoring force $F_b$ becomes greater than the upper restoring force $F_t$. One method of changing the temperature profile of circular bearing structure 5 is to embed several heating elements 6 within the top portion of circular bearing structure 5, as shown in FIG. 6. This causes temperature zones $t_n$ to be warmer than temperature zones $t_1$, $t_2$, and $t_3$, thus achieving the desired balance of forces. Heating elements 6 are well known to those skilled in the art and any suitable type may be used, such as a resistance finger type of heating element that is widely used in the industry.

Figure 7:
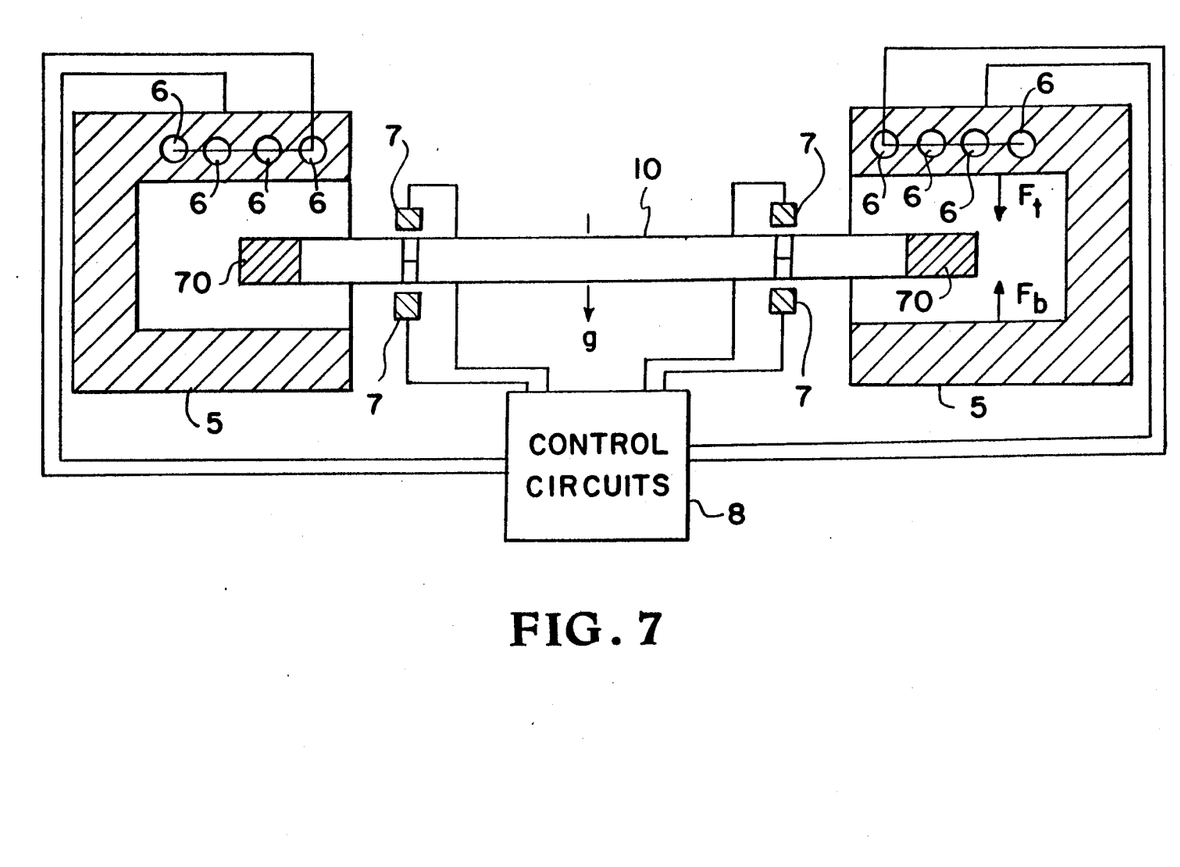
FIG. 7 is a view of a preferred system arrangement for temperature profile control of superconducting bearings according to the present inventive concept.

FIG. 7 shows a system arrangement for utilizing temperature profile control over the levitating or restoring forces of circular bearing structure 5. Rotor 10 is confined within the circular bearing structures 5, each of which has a number of embedded heating elements 6. Heating elements 6 are connected to a feedback control unit 8, as are rotor position sensors 7. The temperature profile of each circular bearing structure 5 is then adjusted according to the information on rotor 10 position provided to control unit 8 by position sensors 7. For example, if rotor 10 begins to fall towards the bottom of either circular bearing structure 5 ($F_b < F_t + g$), then rotor position sensors 7 will sense this condition, and feedback control unit 8 will send an appropriate amount of electrical current to the appropriate heating elements 6, reducing $F_t$ an appropriate amount and restoring the forces within the circular bearing structure 5. Feedback control unit 8 and rotor position sensors 7 are well known in the art, and any suitable type may be used in this embodiment.

Figure 8:
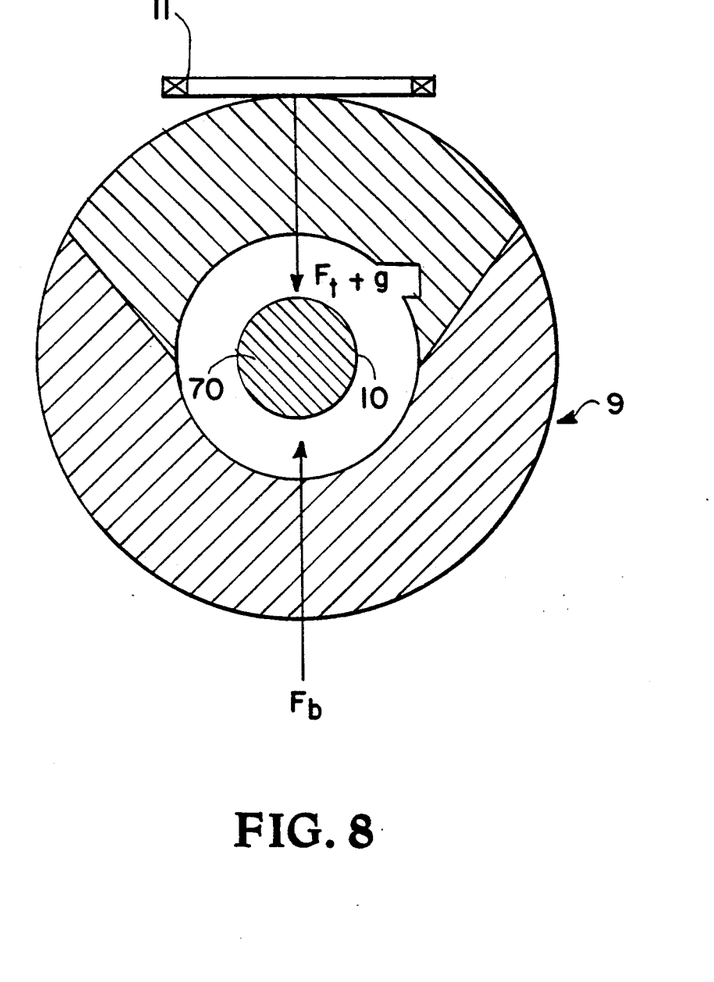
FIG. 8 is a view of a superconducting bearing according to the present inventive concept having electromagnetic control.

A still further device for balancing the forces within the circular bearing structure is shown in FIG. 8, which shows a circular bearing structure 9 according to the present inventive concept having electromagnetic control over the levitating or restoring forces of circular bearing structure 9. In this embodiment, an electromagnetic coil 11 is used to vary force $F_t$ by generating an electromagnetic field above circular bearing structure 9. For example, one could use direct current passing through a conductor to generate an electromagnetic field. The preferred method is to use coils which, regardless of their shape, are substantially symmetrical and have a centerline from which all of the interior surfaces of coil 11 are substantially equidistant. Any materials conventionally used in such coils may be utilized.

Figure 9:
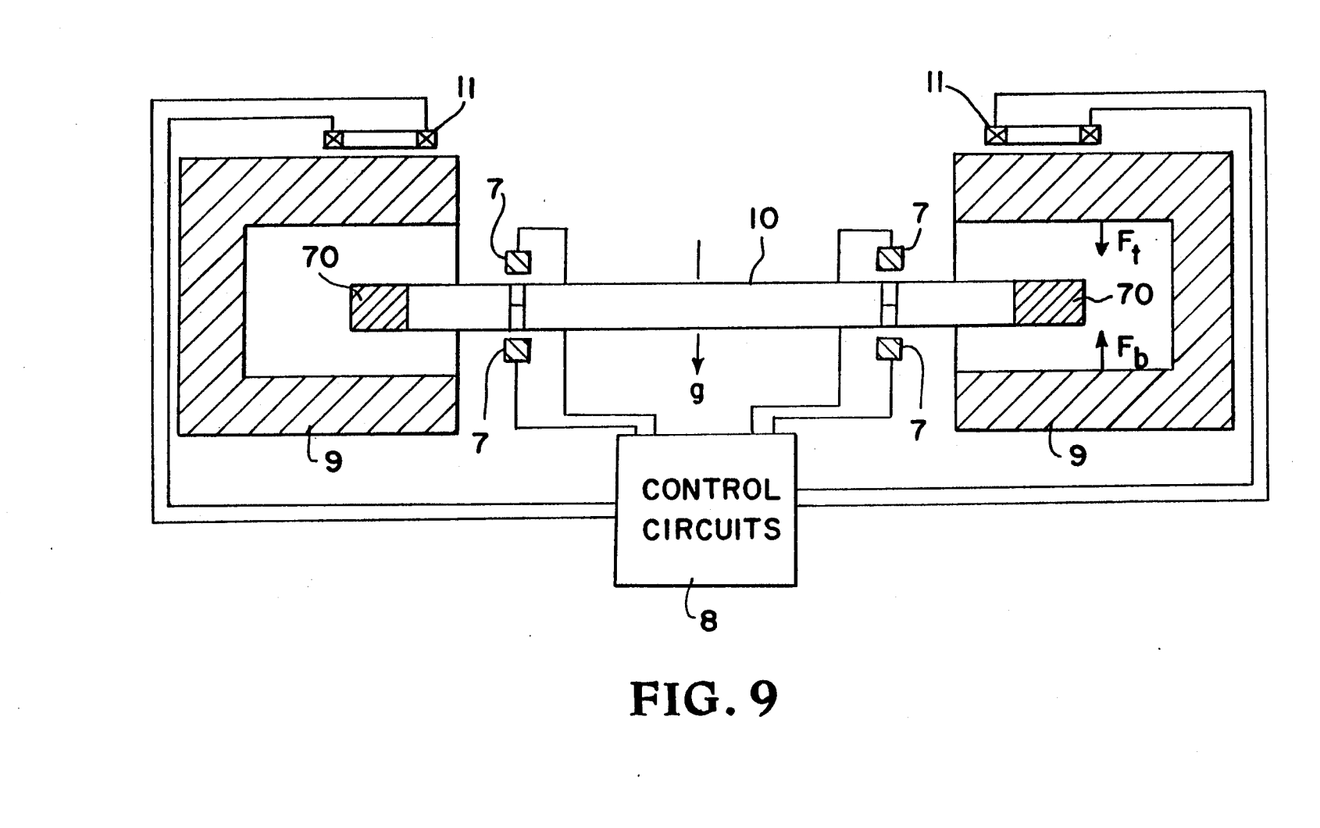
FIG. 9 is a view of a preferred system arrangement for electromagnetic control of superconducting bearings according to the present inventive concept.

FIG. 9 shows a system arrangement for utilizing electromagnetic control over the levitating or restoring forces of circular bearing structure 9. Rotor 10 is confined within the circular bearing structures 9, each of which has an electromagnetic coil 11. Electromagnetic coils 11 are connected to the feedback control unit 8, as are rotor position sensors 7. The electric current through each coil is adjusted by feedback control unit 8 on each circular bearing structure 9 according to the information on rotor 10 position provided to control unit 8 by position sensors 7. For example, if rotor 10 begins to fall towards the bottom of either circular bearing structure 9 ($F_b < F_t + g$), then rotor position sensors 7 will sense this condition, and feedback control unit 8 will send an appropriate amount of electrical current to the appropriate electromagnetic coil 11, reducing $F_t$ an appropriate amount and restoring the forces within the circular bearing structure 9. Feedback control unit 8 is essentially the same as that in FIG. 7, as are shaft position sensors 7.

Figure 10:
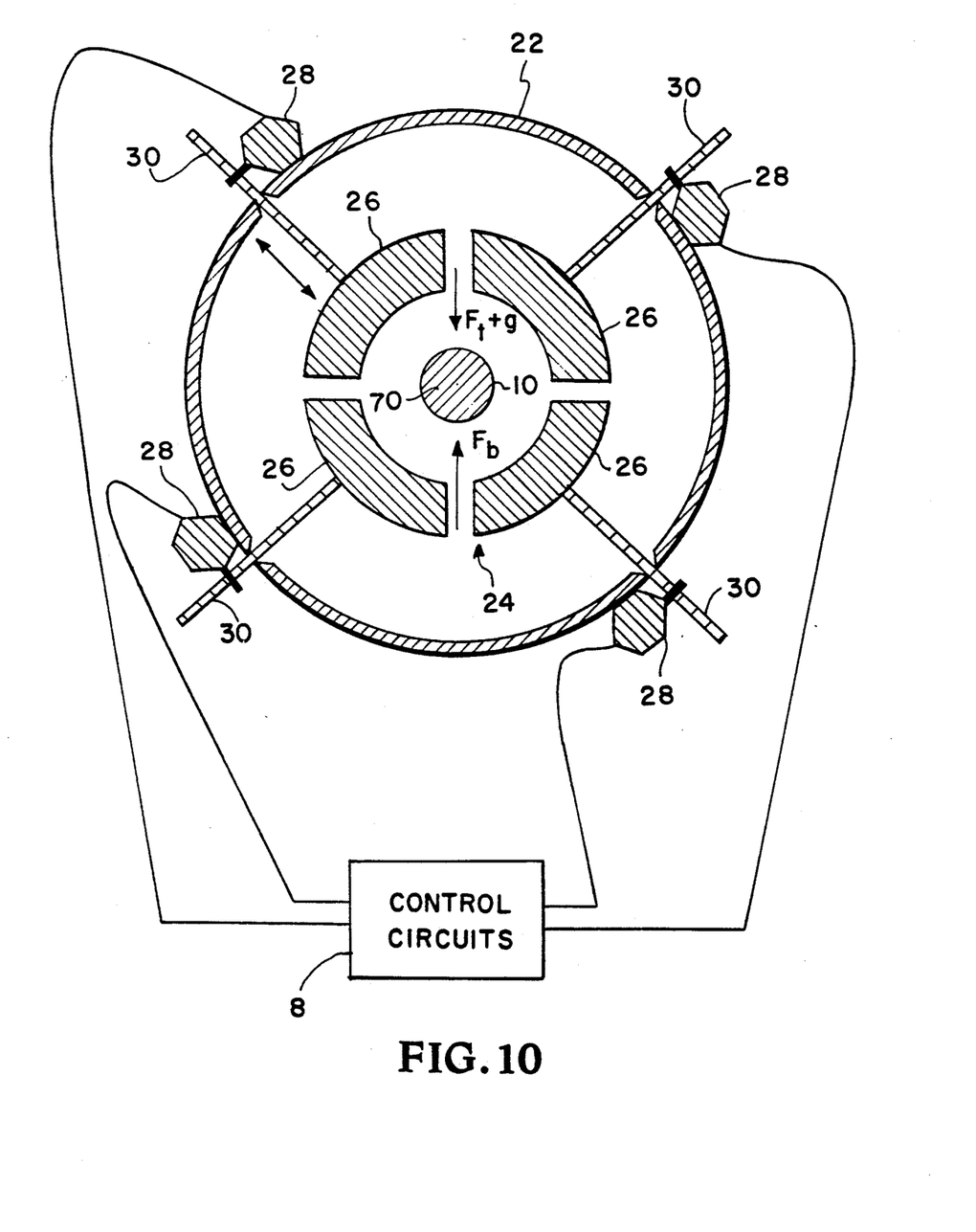
FIG. 10 is a view of a superconducting bearing according to the present inventive concept having segments for control.

A still further device for balancing the forces within the circular bearing structure is shown in FIG. 10, which shows a circular bearing structure 24 according to the present inventive concept having four circular (or any other curved or flat geometry) bearing structure segments 26 to control the levitating or restoring forces of circular bearing structure 24. Each circular bearing structure segment 26 is held in place by adjusting rod 30. Adjusting rod 30 is then raised or lowered by electric motor 28, which is mounted on housing 22. The movement of adjusting rod 30 in and out causes its attached circular bearing structure segment 26 to move towards or away from rotor 10, which allows adjustment of force $F_t$ and or $F_b$. As in FIG. 7 and 9, a feedback control unit 8 is provided to control the four electric motors 28.

Figure 11:
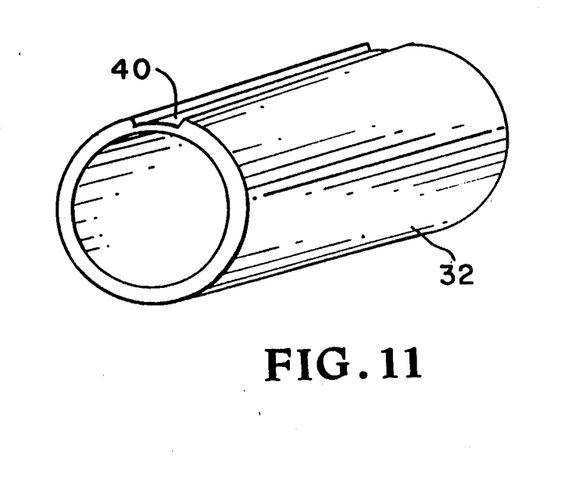
FIG. 11 is a view of a superconducting bearing according to the present inventive concept having an external machined groove for control.
Figure 12:
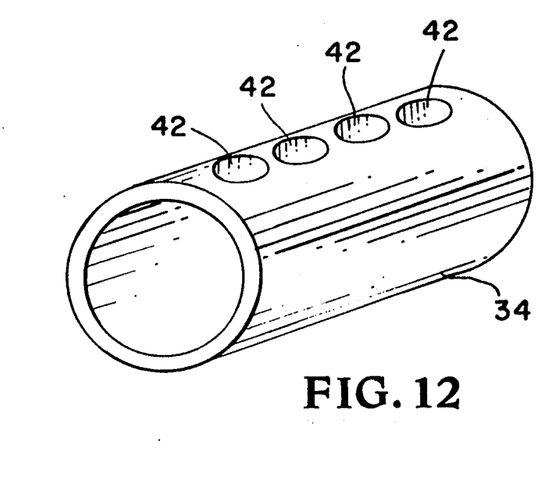
FIG. 12 is a view of a superconducting bearing according to the present inventive concept having machined apertures for control.
Figure 13:
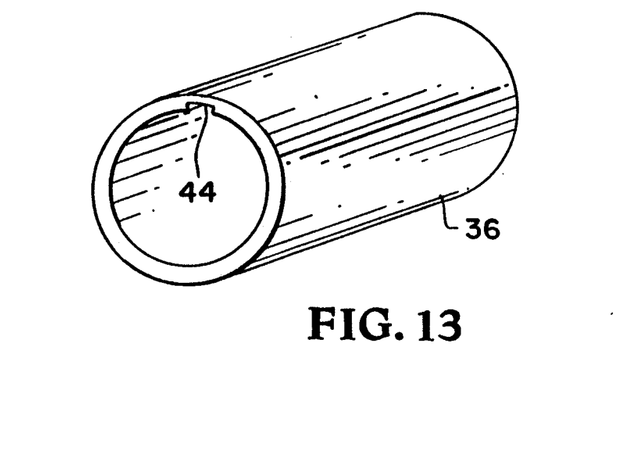
FIG. 13 is a view of a superconducting bearing according to the present inventive concept having an internal machined groove for control.
Figure 14:
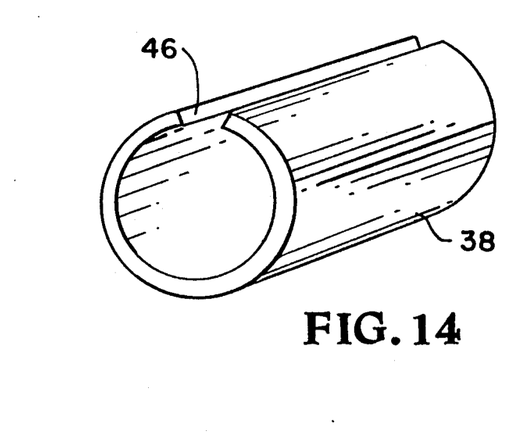
FIG. 14 is a view of a superconducting bearing according to the present inventive concept having machined slot for control.

FIGS. 11 through 14 show four additional devices for control of the restoring forces. FIG. 11 shows a circular bearing structure 32 with an external groove 40 machined along the top of the superconducting material comprising circular bearing structure 32. FIG. 12 shows a circular bearing structure 34 with four apertures 42 machined along the top of the superconducting material comprising circular bearing structure 34. FIG. 13 shows a circular bearing structure 36 with an internal groove 44 machined along the top of the superconducting material comprising circular bearing structure 36. And FIG. 14 shows a circular bearing structure 38 with a slot 46 machined along the top of the superconducting material comprising circular bearing structure 38. In each of these embodiments, effective control of the upper restoring force $F_t$ is provided by removing a portion of the superconducting material comprising the circular bearing structure.

To those skilled in the art, many modifications and variations of the present invention are possible in light of the above teachings. It is therefore to be understood that the present invention can be practiced otherwise than as specifically described herein and still will be within the spirit and scope of the appended claims.

We claim:

1. A superconducting rotating assembly comprising:

first and second bearing means comprising a material exhibiting superconducting properties, each said bearing means formed as a recess in said superconducting material in the form of a cylindrical, closed-end orifice;

a rotatable member having two extremities aligned along a common axis, each extremity encompassed by one said closed end orifice;

magnet means at each extremity, each magnet means having a polar axis which is collinear with said common axis of said rotatable member, each magnet means thereby presenting a single poleface to a bearing means;

means for maintaining each said bearing means at a temperature where said superconducting properties are manifest;

means for rotating said rotatable member, whereby each said magnet means is levitated and is adapted to rotate in a stable non-contacting position by repulsive fields generated by said first and second bearing means;

means for sensing the position of said rotatable member relative to each said bearing means; and means for controlling the levitation forces exerted on said rotatable member by each said bearing means.

2. The superconducting rotating assembly of claim 1 wherein said means for controlling the levitation forces exerted on said rotatable member comprises each said bearing means comprising at least two different superconducting materials.

3. The superconducting rotating assembly of claim 1 wherein said means for controlling the levitation forces exerted on said rotatable member each comprises said bearing means having a lesser quantity of superconducting material at the top of said orifice than at the bottom of said orifice.

4. The assembly of claim 1 wherein said means for sensing the position of said rotatable member comprises a plurality of rotor position sensors connected to a control circuit.

5. The assembly of claim 4 wherein said means for controlling the levitation forces exerted on said rotatable member comprises a means connected to said control circuit for varying the temperature profile of each said bearing means.

6. The assembly of claim 4 wherein said means for controlling the levitation forces exerted on said rotatable member comprises an electromagnetic coil connected to said control circuit adjacent each said bearing means.

7. The assembly of claim 4 wherein said means for controlling the levitation forces exerted on said rotatable member comprises each said bearing means comprising a plurality of segments with means for radial movement of said segments connected to said control circuit.

* * * * *